United States Patent
Mitsuzono et al.

(10) Patent No.: US 6,918,326 B2
(45) Date of Patent: Jul. 19, 2005

(54) VERTICAL LATHE

(75) Inventors: Masaaki Mitsuzono, Numazu (JP); Hiromi Yamasaki, Numazu (JP)

(73) Assignee: Toshiba Kikai Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/860,625

(22) Filed: Jun. 4, 2004

(65) Prior Publication Data

US 2004/0244546 A1 Dec. 9, 2004

(30) Foreign Application Priority Data

Jun. 5, 2003 (JP) ........................................ 2003-161222

(51) Int. Cl.⁷ ................................................ B23B 3/00
(52) U.S. Cl. ........................................ 82/122; 82/131
(58) Field of Search .......................... 82/122, 131, 117, 82/132, 142, 148, 149, 150, 157, 162; 29/40, 53, 55

(56) References Cited

U.S. PATENT DOCUMENTS

| | | | | |
|---|---|---|---|---|
| 3,662,442 A | * | 5/1972 | Noa | 483/27 |
| 4,478,540 A | * | 10/1984 | Sachot | 409/211 |
| 4,521,950 A | * | 6/1985 | Kase et al. | 483/27 |
| 4,608,747 A | * | 9/1986 | Link et al. | 483/14 |
| 4,738,170 A | * | 4/1988 | Isawa et al. | 82/122 |
| 5,105,692 A | * | 4/1992 | Dona et al. | 82/123 |
| 6,189,427 B1 | * | 2/2001 | Kosho et al. | 82/122 |
| 6,257,108 B1 | * | 7/2001 | Otake | 82/1.11 |

FOREIGN PATENT DOCUMENTS

JP 10-142405 5/1998

* cited by examiner

*Primary Examiner*—Willmon Fridie, Jr.
(74) *Attorney, Agent, or Firm*—Pillsbury Winthrop Shaw Pittman LLP

(57) ABSTRACT

There is provided a vertical lathe which, when machining gradually varying lens grooves in a mold for molding of a Fresnel lens, can change the angle of a cutting tool without positional displacement of the cutting tip, enabling high accuracy machining of the gradually varying lens grooves. The vertical lathe includes: a column; a rotary table for rotating a workpiece; a cantilevered cross rail supported by the column; a saddle movable in a horizontal direction along a guideway of the cross rail; a ram suspended from the saddle and movable vertically along a guideway of the saddle; and an inclined head mounted to the lower end of the ram and having an inclined swivel shaft for holding a cutting tool, wherein said swivel shaft is configured to swivel the cutting tool around a nose of the cutting tool as the center of swiveling.

6 Claims, 8 Drawing Sheets

VERTICAL LATHE

BACKGROUND OF THE INVENTION

1. Field of the Invention

The present invention relates to a vertical lathe useful for ultra-precision machining of, for example, a mold for molding a Fresnel lens, and more particularly to a vertical lathe suited for machining of lens grooves having gradually varying inclination angles, such as the lens grooves of a Fresnel lens.

2. Background Art

Figure 9:
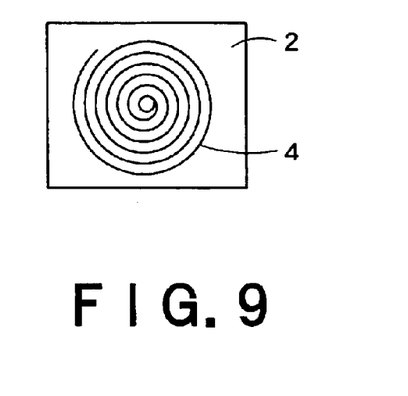
FIG. 9 is a plan view showing a Fresnel lens.
Figure 10:
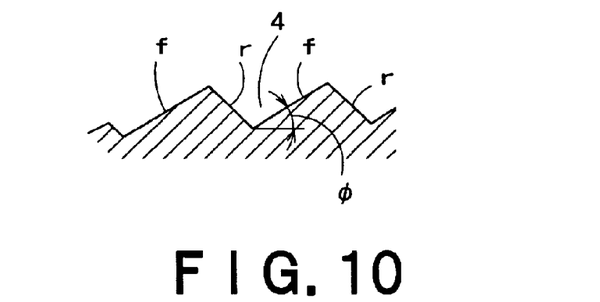
FIG. 10 is a diagram illustrating lens grooves of a Fresnel lens.

FIG. 9 shows a Fresnel lens which is utilized as a condenser lens in a precision optical instrument. The Fresnel lens 2 has concentric or spiral lens grooves 4 each having a V-shaped cross-section. As shown in FIG. 10, one side surface of each lens groove 4 is called Fresnel surface f, while the other side surface is called rise surface r. The Fresnel lens 2 is characterized in that the inclination angle (Fresnel lens angle Ø) of Fresnel surface f slightly differs between adjacent grooves and gradually varies.

Fresnel lenses have recently been produced by injection molding processes. In machining of a mold for molding a Fresnel lens, it is necessary to machine with precision lens grooves whose inclination angles of Fresnel surfaces f vary gradually.

Vertical lathes have been employed as a machine tool for carrying out machining of such gradually varying grooves (see Japanese Laid-Open Publication No. 1998-142405).

Figure 12:
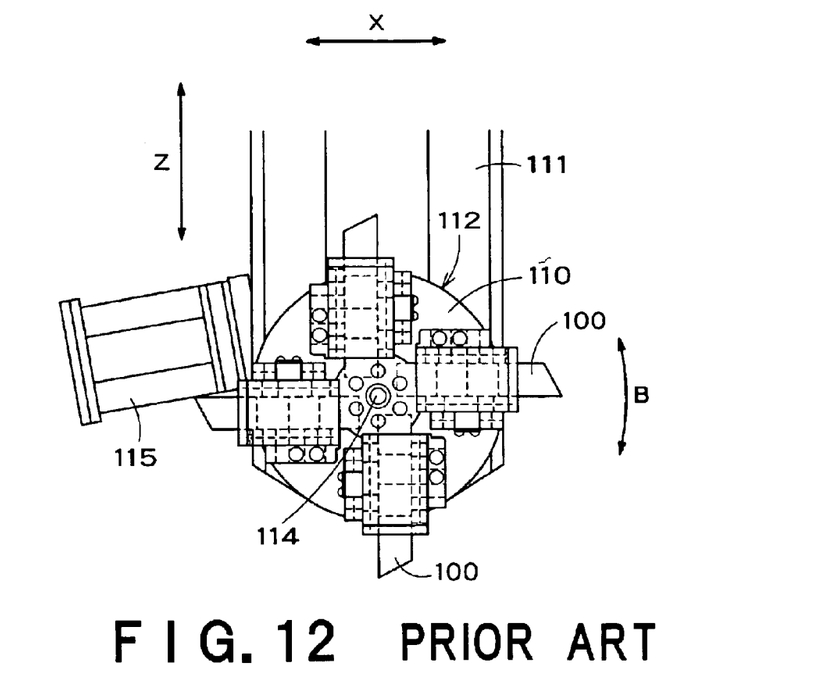
FIG. 12 is a diagram illustrating a tool post swivel mechanism provided in a conventional vertical lathe.
Figure 13:
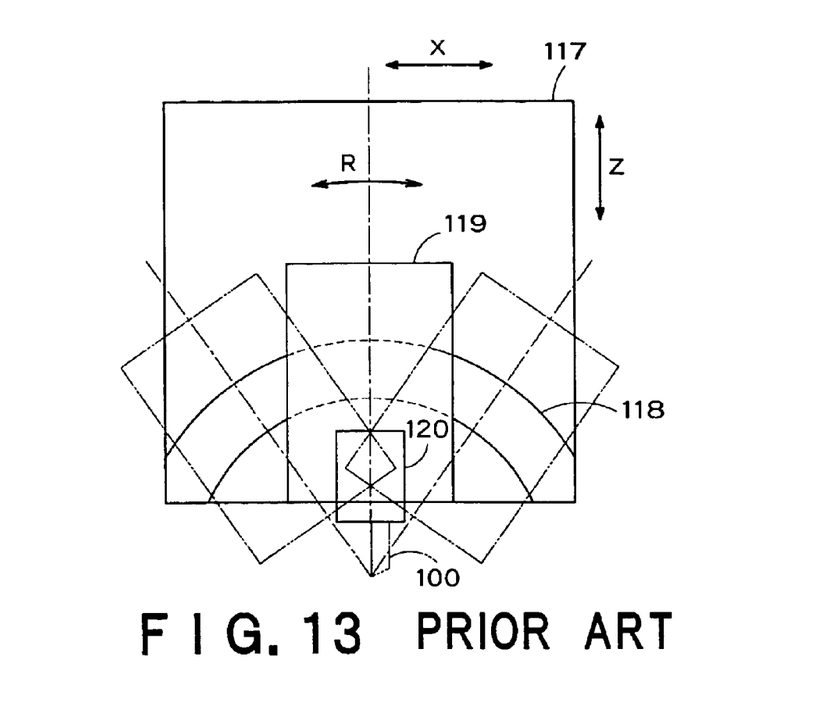
FIG. 13 is a diagram illustrating another tool post swivel mechanism provided in a conventional vertical lathe.

Conventional vertical lathes for carrying out machining of such gradually varying grooves include a tool post swivel mechanism for changing the nose angle of a cutting tool. FIGS. 12 and 13 show tool post swivel mechanisms of conventional vertical lathes. In vertical lathes that employ the respective tool post swivel mechanism, a saddle moves linearly and horizontally in the X-axis direction and a ram moves linearly and vertically in the Z-axis direction by means of a mechanism common to the lathes. For swiveling of the respective tool posts in the B-axis direction, however, the lathes employ different mechanisms.

Referring first to the tool post swivel mechanism of FIG. 12, the tool post 110 is of a type provided with four cutting tools 100. A swivel head 112, which supports a swivel shaft 114 by an air bearing, is mounted to the lower end portion of a ram 111. The swivel shaft 114 is secured in the center of the tool post 110, and the four cutting tools 100 are held symmetrically about the swivel shaft 114 at an angle of 90° with each other. In FIG. 12, reference numeral 115 denotes a servo motor for driving the swivel shaft 114.

In the tool post swivel mechanism shown in FIG. 13, on the other hand, an R guide 118 having an arc-shaped guide surface is provided at the lower end of a ram 117. A swivel base 119 swings or tilts by the guide of the R guide 118 so that a cutting tool 100, which is held by a tool post 120 fixed on the swivel base 119, is allowed to swivel with its nose as the center of swiveling. Thus, only one cutting tool 100 is held by the tool post 120. As a drive mechanism for the B-axis swiveling is employed a mechanism (not shown) which converts a linear movement, for example by means of a ball screw mechanism, into the tilting movement of the swivel base 20. The tool post swivel mechanism of FIG. 13 differs in this respect from the tool post swivel mechanism of FIG. 12 which simply swivels the tool post 110 by means of the B-axis swivel shaft 114.

Figure 11:
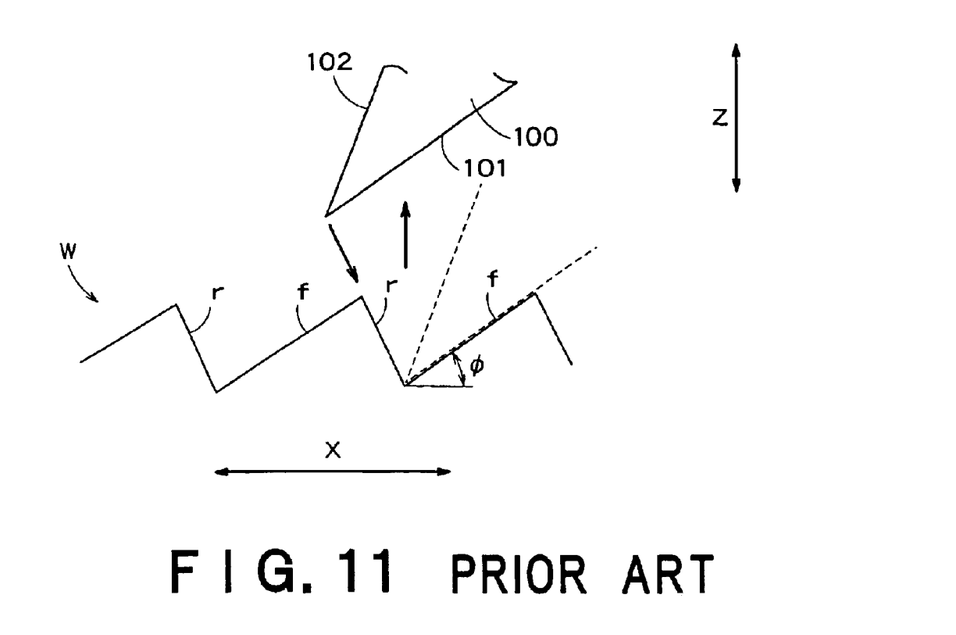
FIG. 11 is a diagram illustrating a conventional machining of the lens grooves of a mold for molding a Fresnel lens.

Machining (cutting) of lens grooves in a mold for molding of a Fresnel lens, using the conventional vertical lathe having the tool post swivel mechanism shown in FIG. 12, is carried out in the following manner. First, while a cutting edge 101 of the cutting tool 100 is inclined in conformity with a Fresnel lens angle Ø, as shown in FIG. 11, the cutting tool 100 is lowered while a turning table is rotated so that by synthesized feed of the tool by X-axis and Z-axis movements, cutting of a rise surface r is effected to a certain cut-in depth in the rise surface r of a workpiece W. When the cutting tool 100 has reached a predetermined depth (in the Z-axis direction), the cutting edge 101 of the cutting tool 100 is transferred to the workpiece W to create a Fresnel surface f. The rise surface r cannot be cut into a mirror surface by the above cutting operation because of the synthetic feed by X-axis and Z-axis movements.

Next, following the machining of the Fresnel surface f, finish machining of the rise surface r with a cutting edge 102 is carried out by the following operation.

The cutting tool 100 is released from the workpiece W, and the tool post 110 is swiveled so that the cutting edge 102 of the cutting tool 100 matches the inclination of the rise surface r. By the swiveling of the tool post 110, the X-axis position of the cutting tip of the cutting tool 100 is displaced widely from the lowermost point at the bottom of the lens groove. Accordingly, the cutting tool 100 must be moved by X-axis movement to align the cutting tip of the cutting tool 100 with the lowermost point at the bottom of the lens groove. Thereafter, the cutting tool 100 is lowered by Z-axis movement to carry out machining of the rise surface r to a certain cut-in depth.

The angular change of the cutting tool 100 thus involves X-axis movement and Z-axis movement, which may entail errors, such as a positioning error and a displacement of the position of the cutting edge due to an error in the X-axis linear feed motion. Such errors lead to a deviation of the position of the nose of the cutting tool 100 from the intended lowermost point at the bottom of each lens groove, resulting in errors in the pitch and the depth of lens grooves.

In the case of the tool post swivel mechanism shown in FIG. 13, on the other hand, the cutting tool 100 swivels with its nose as the center of swiveling, as described above. It is, therefore, theoretically possible that after machining of a Fresnel surface f, the cutting edge 102 of the cutting tool 100 can be matched to a rise surface r only by swiveling the swivel base 119 while keeping the nose of the cutting tool 100 at the lowermost point at the bottom of the lens groove.

In actual machining, however, it is very difficult to position the nose of the cutting tool 100 at the center of swiveling and keep the position during the swiveling operation. It is noted in this regard that the accuracy of movement (swiveling) is greatly influenced by the configurational accuracy (roundness) of the guide surface of the R guide 118 which guides the swivel base 119, and it is very difficult to provide the guide surface of the R guide 118 with high roundness. Thus, depending upon how the swivel base 119 makes contact with the guide surface of the R guide 118, it is possible that the position of the nose of the cutting tool 100 deviates from the intended position. Further, according to the tool post swivel mechanism shown in FIG. 13, because of the large radius of swiveling of the cutting tool 100, the swivel mechanism of a considerable weight is disposed on the front side of a cross rail. This tends to cause a torsion in the cross rail, which may significantly affect the position of the cutting tip of the cutting tool 100, leading to displacement of the actual position of the cutting tip from the intended position.

SUMMARY OF THE INVENTION

It is therefore an object of the present invention to solve the above problems in the prior art and provide a vertical lathe which, when machining gradually varying lens grooves in a mold for molding of a Fresnel lens, can change the angle of a cutting tool without positional displacement of the cutting tip, enabling high accuracy machining of the gradually varying lens grooves.

In order to achieve the above object, the present invention provides a vertical lathe comprising: a column;

a rotary table for rotating a workpiece; a cantilevered cross rail supported by the column; a saddle movable in a horizontal direction along a guideway of the cross rail; a ram suspended from the saddle and movable vertically along a guideway of the saddle; and an inclined head mounted to the lower end of the ram and having an inclined swivel shaft for holding a cutting tool, wherein said swivel shaft is configured to swivel the cutting tool around a nose of the cutting tool as the center of swiveling.

In a preferred embodiment of the present invention, the inclined head includes the swivel shaft rotatably supported by a bearing and inclined with respect to a horizontal plane, an eccentric arm eccentric to the axis of the swivel shaft and extending in the axial direction, a tool holder mounted to the front end of the eccentric arm and holding the cutting tool, and a swivel index means for rotating the swivel shaft and indexing the swivel the cutting tool.

DETAILED DESCRIPTION OF THE PREFERRED EMBODIMENT

A Preferred embodiment of the present invention will now be described with reference to the drawings.

Figure 1:
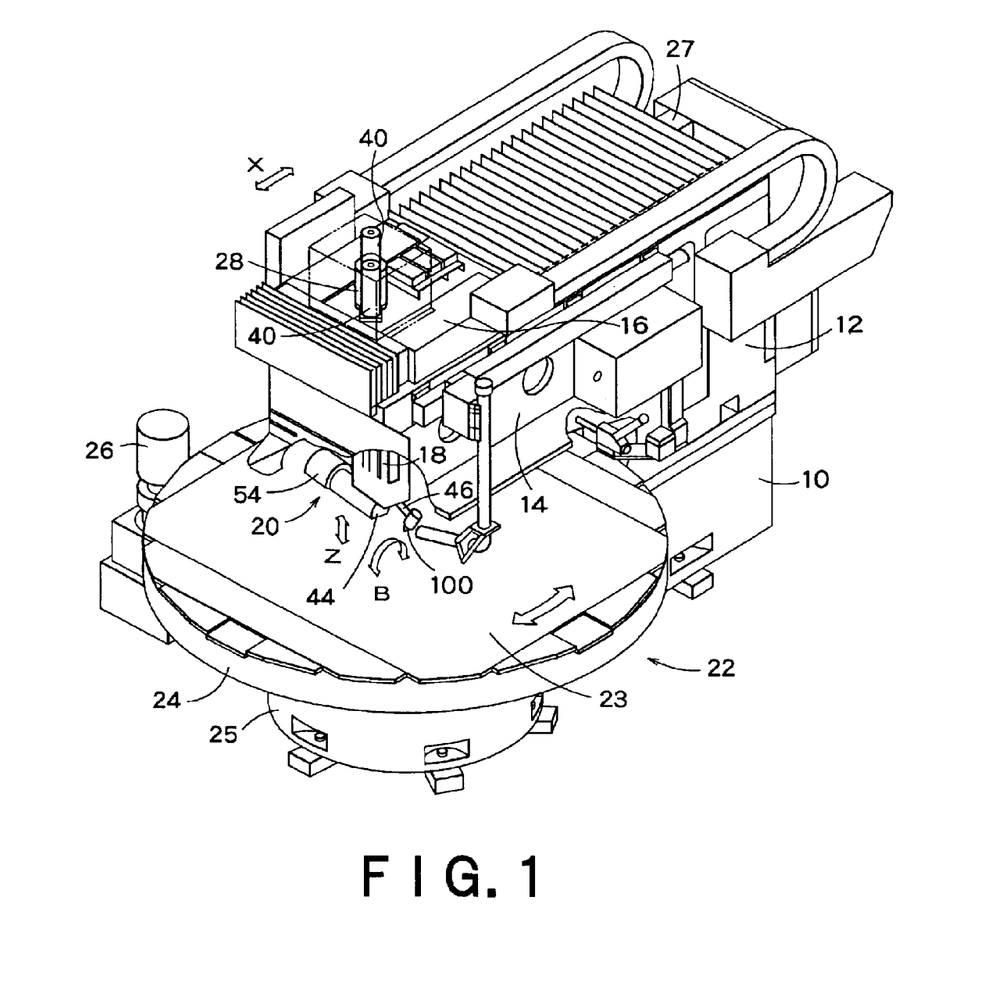
FIG. 1 is a perspective view of a vertical lathe according to an embodiment of the present invention.
Figure 2:
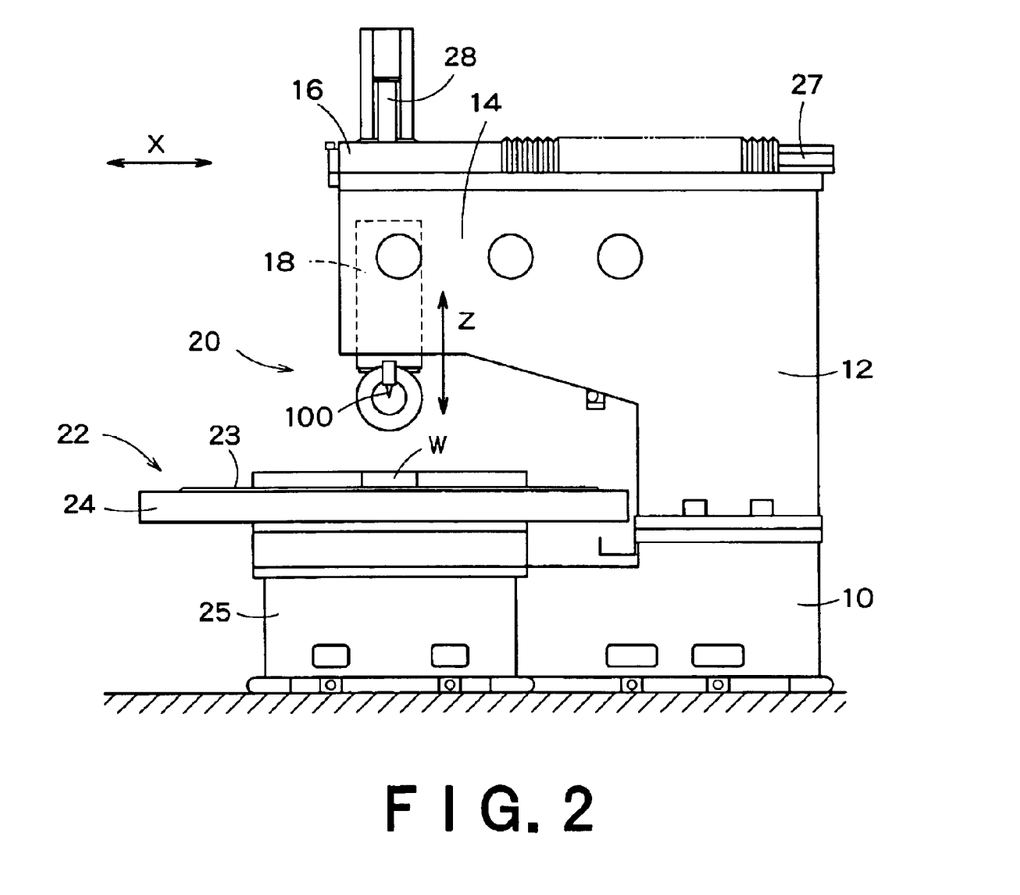
FIG. 2 is a side view of the vertical lathe according to the embodiment.

FIG. 1 is a perspective view showing the overall construction of a vertical lathe according to an embodiment of the present invention, and FIG. 2 is a side view of the vertical lathe. In FIGS. 1 and 2, reference numeral 10 denotes a bed. A column 12 is installed on the upper surface of the bed 10. According to this embodiment, a cantilevered cross rail 14, integrally with the column 12, constitutes an integral upper structure. On the cross rail 14 is provided a saddle 16 which is movable horizontally on the cross rail 14. A vertically movable ram 18 is suspended from the saddle 16. To the lower end of the ram 18 is mounted an inclined head 20. A cutting tool 100 is held at the front end of the inclined head 20.

Reference numeral 22 denotes a rotary table. The rotary table 22 is comprised of a turning table 24 provided with a vacuum chuck 23 for fixing a workpiece to be machined, and a table body 25 rotatably supporting the turning table 24 in a horizontal attitude. The table body 25 is connected to a table drive unit 26.

According to the vertical lathe of this embodiment, the saddle 16 is moved horizontally in the X-axis direction, and a ball screw feed mechanism for the X-axis movement of the saddle 16 is driven by an X-axis servo motor 27. The ram 18 is moved vertically in the Z-axis direction, and a ball screw feed mechanism for the Z-axis movement of the ram 18 is driven by a Z-axis servo motor 28.

Figure 3:
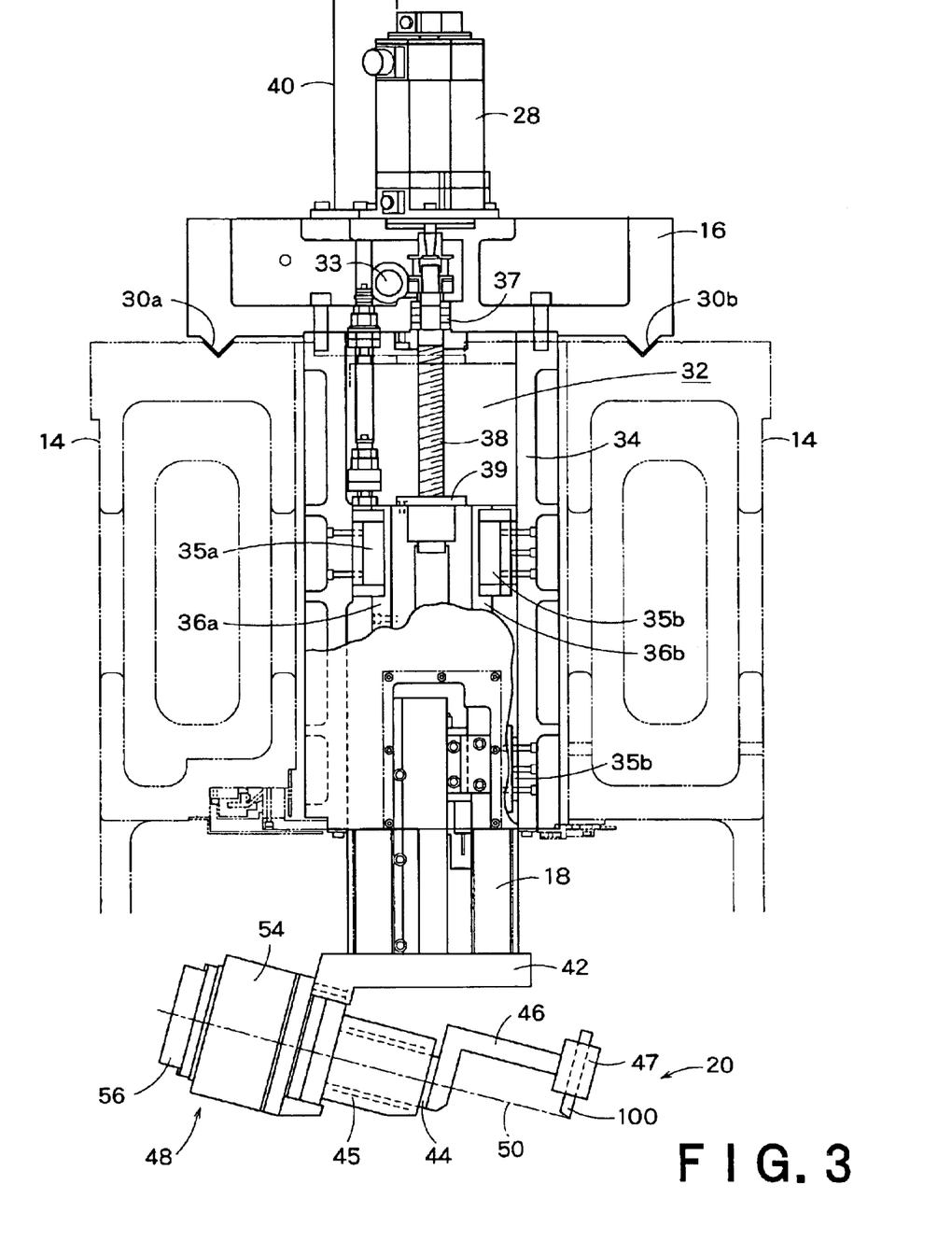
FIG. 3 is a cross-sectional view showing the constructions of the saddle and the ram of the vertical lathe according to the embodiment.

FIG. 3 shows the details of the constructions of the saddle 16 and the ram 18. In FIG. 3, two X-axis guide surfaces 30a, 30b, parallel to each other, for guiding the movement of the saddle 16 are provided in the upper surface of the cross rail 14. A hollow portion 32 housing the ram 18 is formed in the center of the cross rail 14. The saddle 16 bridges the hollow portion 32 and is supported on either side by the X-axis guide surfaces 30a, 30b. The X-axis guide surfaces 30a, 30b are comprised of a limited-type rolling guide. Reference numeral 33 denotes an X-axis ball screw constituting the X-axis ball screw feed mechanism.

A ram guide member 34 in the shape of a square cylinder is suspended from the bottom of the saddle 16. Z-axis linear guide sections 35a, 35b, each comprised of a vertically-extending rolling guide, are fixed to the left and right inner side surfaces of the ram guide member 34. Vertically-extending Z-axis guide rails 36a, 36b are mounted to the left and right side surfaces of the ram 18, and the Z-axis guide rails 36a, 36b engage the Z-axis linear guide sections 35a, 35b.

An X-axis servo motor 28 is installed on the upper surface of the saddle 16. A vertically-extending Z-axis ball screw 38 is rotatably supported by a bearing member 37 at the bottom of the saddle 16. A ball nut 39 is fixed to the upper end of the ram 18, and the ball nut 39 makes screw engagement with the Z-axis ball screw 38. A pair of balanced cylinders 40 is mounted on the upper surface of the saddle 16. The weight of the ram 18 is supported by the balanced cylinders 40, thereby reducing the load on the Z-axis servo motor 28.

To the lower end of the ram 18 is mounted, instead of the conventional tool post with a swivel head shown in FIG. 12, the below-described inclined head 20 having an inclined swivel shaft 44. The use of the inclined head 20 makes it possible to set the center of swiveling at the cutting tip of the cutting tool 100 and change the cutting edge angle of the cutting tool 100 without changing the position of the cutting tip.

Figure 4:
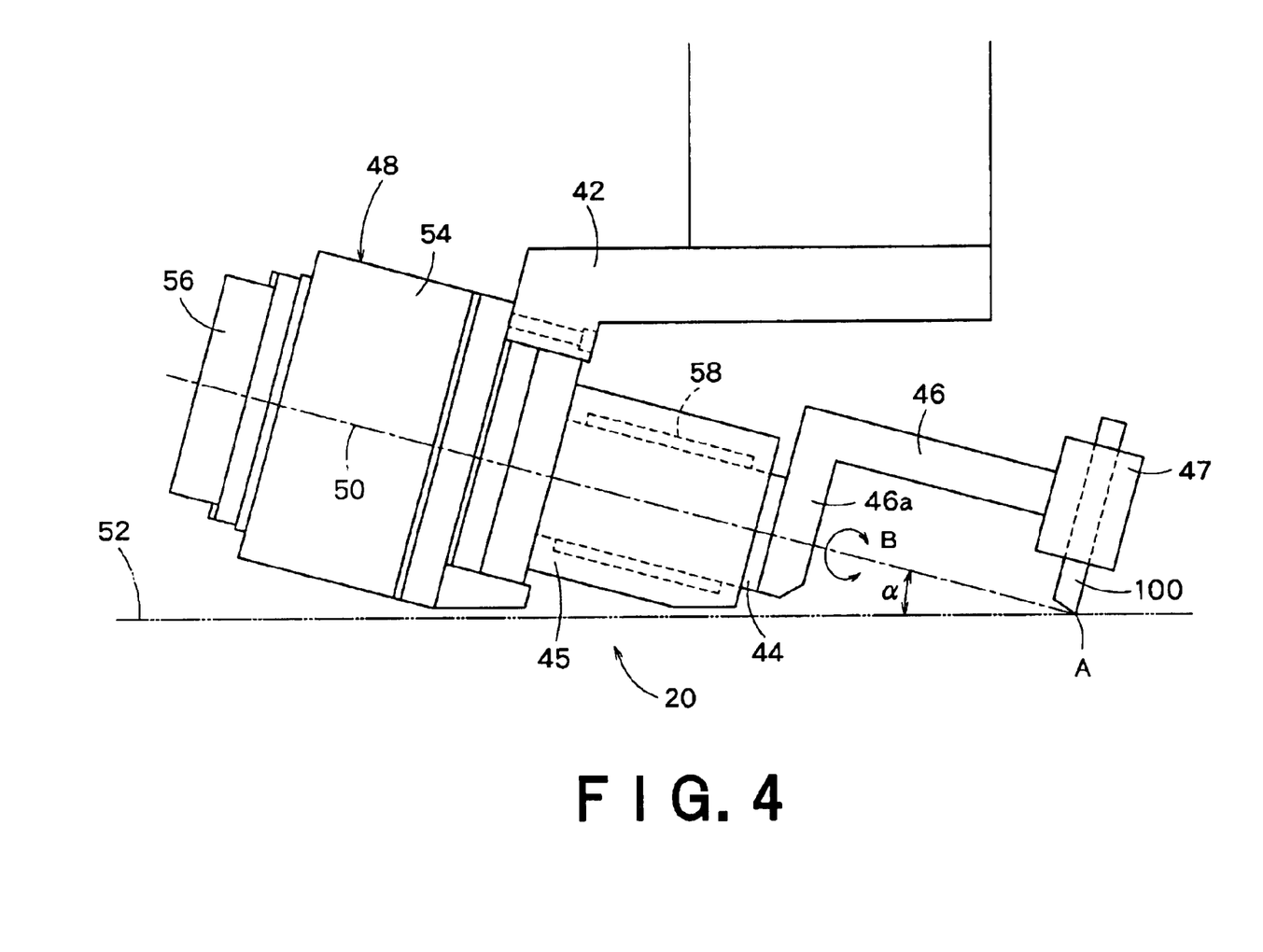
FIG. 4 is a side view of an inclined head provided in the vertical lathe according to the embodiment.

FIG. 4 shows the inclined head 20. In FIG. 4, reference numeral 50 denotes the axis of the swivel shaft 44, and reference numeral 52 denotes a horizontal plane (table surface). The "a" indicates the angle of inclination formed between the axis 50 of the swivel shaft 44 and the table surface 52.

The inclined head 20 is held by a bracket 42 such that the axis 50 of the swivel shaft 44 forms an inclination angle a with the table surface 52. Those portions of the inclined head 20 which interfere with the table surface 52 are chamfered as much as possible so as to make the inclination angle a small. According to this embodiment, the inclination angle a is set at 15°. The inclination angle a of the swivel shaft 44 is preferably within 30°.

The inclined head 20 is comprised of a head body 45, an eccentric arm 46, a tool holder 47 for holding the cutting tool 100, and a swivel index section 48 for indexing the swivel angle of the cutting tool 100.

A base portion 46a of the eccentric arm 46, extending at a right angle with the axis 50, is fixed to the front end of the swivel shaft 44. The eccentric arm 46, which is eccentric to the axis 50 with a predetermined radius of eccentricity, further extends from the base portion 46a at a right angle therewith and parallel to the axis 50. The tool holder 47 is mounted to the front end of the eccentric arm 46. The tool holder 47 holds the cutting tool 100 at a right angle with the eccentric arm 46. The use of such eccentric arm 46 enables the nose A of the cutting tool 100 to be positioned on the axis 50, as shown in FIG. 4, that is, the nose A can be set as the center of swiveling.

The swivel index section 48 is driven by a servo motor 54. The swivel index section 48 takes positional feedback by means of a rotary encoder 56 and controls the rotation of the servo motor 54 to thereby index the swivel angle of the swivel shaft 44 with an accuracy of $\frac{1}{100,000}$ degree. The B-axis denotes the control axis of such swivel index section 48.

In response to the B-axis indexing accuracy, an air bearing 58 for rotatably supporting the swivel shaft 44 is incorporated into the head body 45.

A description will now be given of machining of the gradually varying lens grooves of a mold for molding a Fresnel lens by way of an machining example as carried out with the vertical lathe of this embodiment having the above-described construction.

Figure 5:
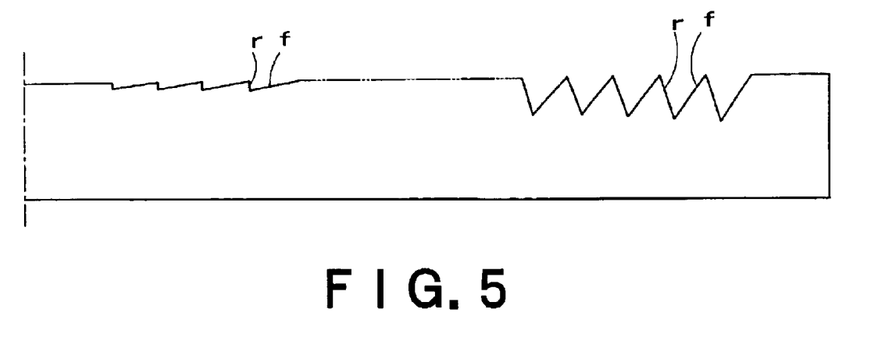
FIG. 5 is a diagram illustrating the lens grooves of a mold for molding a Fresnel lens.

FIG. 5 is a diagram illustrating the configuration of the lens grooves of a mold for molding a Fresnel lens. In the lens grooves arranged concentrically, the inclination angle of Fresnel surface f of a groove gradually increases as the groove becomes closer to the circumference. Depending upon the type of Fresnel lens, the inclination angle of rise surface r either vary gradually or is constant. According to this embodiment, the lens grooves having such Fresnel surfaces are machined in the follow manner.

In preparation for machining, positioning is made in the inclined head 20 so that the nose A of the cutting tool 100 held by the tool holder 47 lies on the axis 50 of the swivel shaft 44, as shown in FIG. 4.

Referring to FIG. 2, the workpiece W whose lens grooves are to be machined by turning, is fixed by means of the vacuum chuck 23 while the center of the workpiece W is aligned with the center of rotation of the turning table 24. The turning table 24 is then rotated.

Figure 6A:
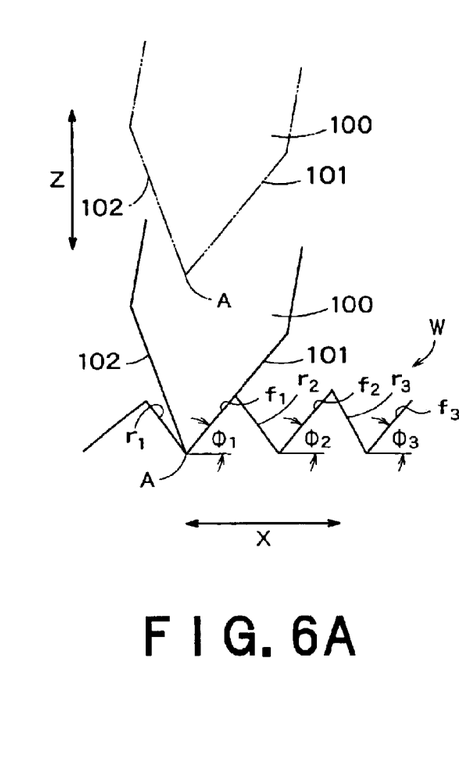
FIGS. 6A and 6B are diagrams illustrating the movement of a cutting tool in machining of gradually varying grooves.

By moving the saddle 16 in the X-axis direction, the inclined heal 20 is moved to a machining position. FIG. 6 shows the positional relationship between the workpiece W and the nose A of the cutting tool 100. First, as shown by the broken lines in FIG. 6A, the X-axis position of the nose A is aligned with the intended position of the lowermost point at the bottom of a lens groove with a Fresnel surface f1. The swivel index section 48 is then driven by the B-axis servo motor 54 to swivel the swivel shaft 44, so that the angle of a cutting edge 101 of the cutting tool 100 becomes identical with the inclination angle Ø1 of the Fresnel surface f1.

Thereafter, the cutting tool 100 is lowered in the Z-axis direction, and the cutting edge 101 of the cutting tool 100 is transferred to the workpiece W to create a Fresnel surface f1.

At the time of the creating of Fresnel surface f1, the nose A of the cutting tool 100 is positioned just on the lowermost point at the bottom of the lens groove and also on the axis 50 of the swivel shaft 44 of the inclined head. Accordingly, the cutting tool 100 can swivel with the lowermost point at the bottom of the lens groove as the center of swiveling.

Figure 6B:
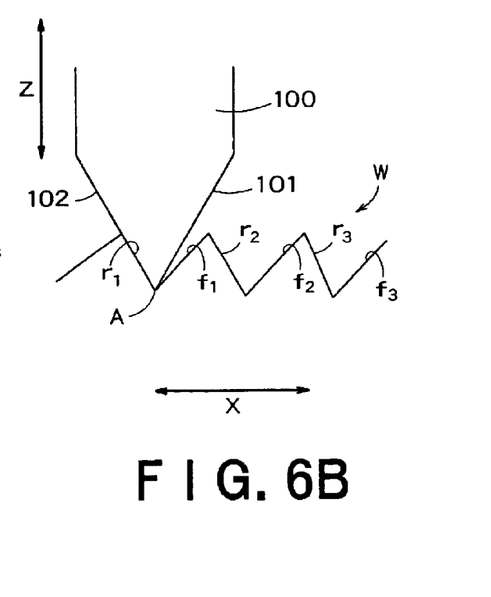

Therefore, in order to machine a rise surface r1 subsequently to the machining of the Fresnel surface f1, the cutting tool 100 is swiveled by B-axis swiveling with the nose A as the center of swiveling, without a Z-axis movement, whereby a cutting edge 102 of the cutting tool 100 can be matched to the inclination of the rise surface r1 (FIG. 6B). The cutting edge 102 of the cutting tool 100 can thus be transferred to the workpiece W to create a rise surface r1 without changing the position of the nose A of the cutting tool 100.

After machining of one lens groove is thus completed, the cutting tool 100 is released from the lens groove by Z-axis movement, and is then moved by X-axis movement to a position above the next lens groove having a Fresnel surface f2. The X-axis position of the nose A of the cutting tool 100 is aligned with the lowermost point at the bottom of the lens groove, and the cutting tool 100 is then swiveled by B-axis swiveling so as to make the angle of the cutting edge 101 identical with the inclination angle Ø2 of the Fresnel surface f2. Thereafter, the same operation as in the machining of the first lens groove is repeated, whereby the Fresnel surface f2 and the rise surface r2 can be machined successively without changing the position of the nose A of the cutting tool 100.

As described above, according to the inclined head 20 in which the nose A of the cutting tool 100 is positioned on the axis of the swivel shaft 44, the angles of the cutting edges of the cutting tool 100 can be changed to be matched to a Fresnel surface f and a rise surface r only by the B-axis swiveling operation without an X-axis or Z-axis movement. This eliminates a displacement which may be caused by an X-axis movement of the saddle 16 or a Y-axis movement of the ram 18 and which would cause a nose position error of the cutting tool.

Further, the inclined swivel shaft 44 is supported by the air bearing 58 and, in addition, the swivel movement of the cutting tool 100 is made under a numeral control with the index mechanism 48, which is driven by the servo motor 54, as the B-axis. Accordingly, as compared with the conventional swivel mechanism which likewise can set the cutting tip as the center of swiveling but which relies on the roundness of the R guide for the movement accuracy, the inclined head 20 according to the present invention can obtain an incomparably high index accuracy. Further, since neither an X-axis movement nor a Y-axis movement is involved in the operation of changing the cutting edge angle of the cutting tool 100 from the inclination angle of a Fresnel surface f to the inclination angle of a rise surface r, the operation time can be reduced. Because of the generally large number of lens grooves, this leads to a considerable reduction in the total machining time.

Having described above machining (turning) of a mold for molding a Fresnel lens, the vertical lathe of the present invention, in combination with a linear movement-type planer table, can also be applied to machining (planing) of a mold for molding an optical waveguide.

Figure 7:
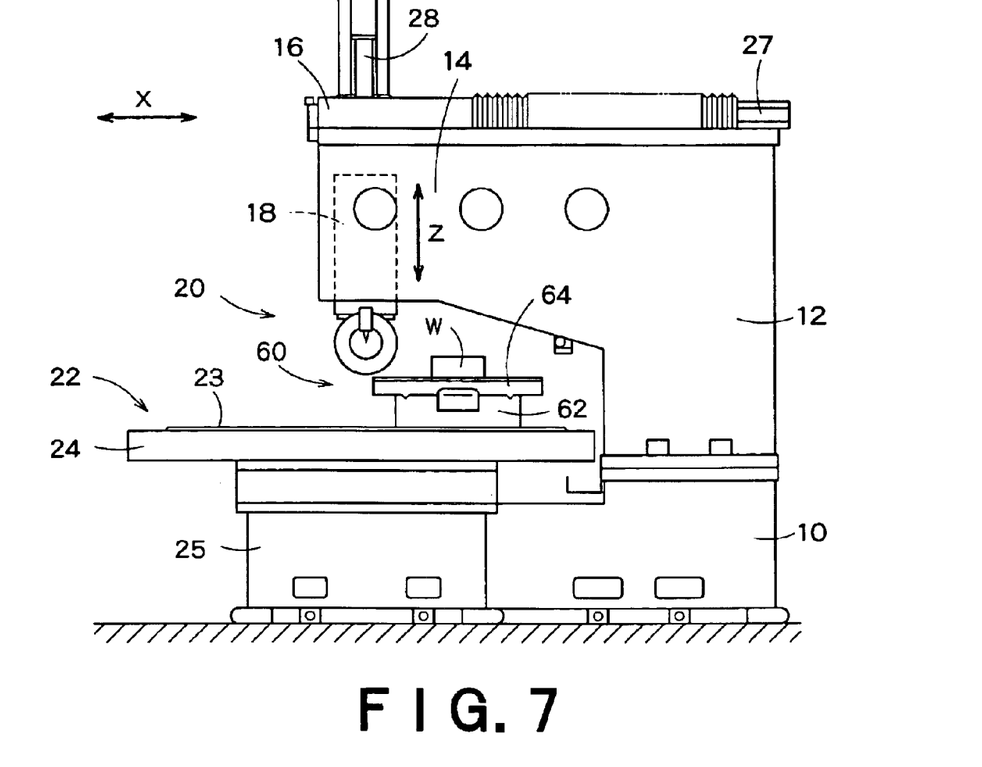
FIG. 7 is a side view of the vertical lathe with a planer table mounted on the turning table.

FIG. 7 is a side view showing the vertical lathe adapted for setting a planer table 60 on the turning table 24 to perform planing.

The planer table 60 is basically comprised of a table base 62 fixed on the upper surface of the turning table 24, and a movable table 64 which is movable on the table base 62. V-shaped grooves, constituting a linear guide, are formed in the upper surface of the table base 62, so that by the guide of the grooves, the movable table 64 can move linearly by means of a not-show ball screw feed mechanism.

According to the vertical lathe, the Y-axis indicates a control axis for the feed of the movable table 64. The axial direction of the ball screw can change with the rotation of the turning table 24. When carrying out planing, therefore, the position of the turning table 24 is indexed so that the axial direction of the ball screw coincides with the direction orthogonal to both the X-axis and the Z-axis (direction perpendicular to the paper sheet of FIG. 7), and the turning table 24 is then fixed by means of a not-shown clamp means, thereby making the axial direction of the ball screw coincident with the direction of the Y-axis which is the positional control axis on the machine.

According to the vertical lathe of this embodiment thus provided with the planer table 60 on the rotary table 22, machining (planing) of gradually varying lens grooves can be carried out in the following manner.

Figure 8:
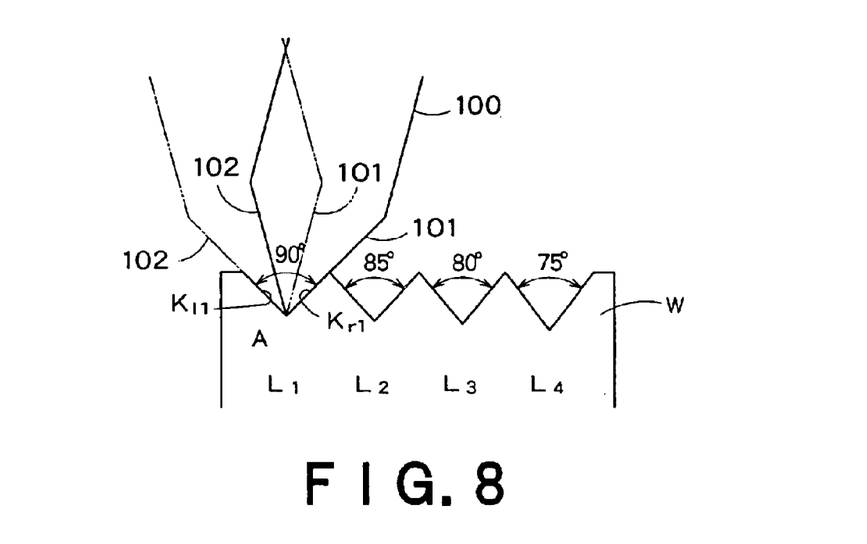
FIG. 8 is a diagram illustrating the movement of a cutting tool in planing of gradually varying lens grooves.

FIG. 8 shows the configuration of the lens grooves of a mold for molding an optical waveguide. The lens grooves extend parallel to each other, and the angle formed between the inclined surfaces of a lens groove gradually increases as the groove is closer to the left side end of the mold. In each lens groove, the inclination angles of the both inclined surfaces are equal.

First, the inclined head 20 is moved by X-axis movement of the saddle 16 to a machining position, and the X-axis position of the nose A of the cutting tool 100 is aligned with the lowermost point at the bottom of a lens groove L1. The B-axis servo motor 54 is then driven to swivel the swivel shaft 44 so as to make the angle of the cutting edge 101 of the cutting tool 100 identical with the inclination angle of an inclined surface Kr1 on the right side.

Next, the cutting tool 100 is lowered by Z-axis movement, and the cutting edge 101 of the cutting tool 100 is transferred to the workpiece W while cutting the workpiece W into a predetermined depth and moving the movable 64 by Y-axis movement, thereby creating a Fresnel surface Kr1.

Thereafter, the cutting tool 100 is swiveled by B-axis swiveling with the nose A as the center of swiveling so as to make the angle of the cutting edge 102 of the cutting tool 100 identical with the inclination angle of an inclined surface Kl1 on the left side. The cutting edge 102 of the cutting tool 100 is then transferred to the workpiece W while moving the movable table 64 by Y-axis movement, thereby creating a Fresnel surface Kl1. The right inclined surface Kr1 and the left inclined surface Kl1 can thus be processed successively without changing the position of the nose A of the cutting tool 100. The other lens grooves can also be machined in the same manner.

As described hereinabove, the vertical lathe of the present invention, when machining gradually changing lens grooves in a mold for molding a Fresnel lens, can change the angle of a cutting tool without positional displacement of the cutting tip and effect high accuracy machining of the gradually varying lens grooves.

What is claimed is:

1. A vertical lathe comprising:

a column;

a rotary table for rotating a workpiece;

a cantilevered cross rail supported by the column;

a saddle movable in a horizontal direction along a guideway of the cross rail;

a ram suspended from the saddle and movable vertically along a guideway of the saddle; and an inclined head mounted to the lower end of the ram and having an inclined swivel shaft for holding a cutting tool, wherein said swivel shaft is configured to swivel the cutting tool around a nose of the cutting tool as the center of swiveling.

2. The vertical lathe according to claim 1, wherein the inclined head includes the swivel shaft rotatably supported by a bearing and inclined with respect to a horizontal plane, an eccentric arm eccentric to the axis of the swivel shaft and extending in the axial direction, a tool holder mounted to the front end of the eccentric arm and holding the cutting tool, and a swivel index means for rotating the swivel shaft and indexing the cutting tool.

3. The vertical lathe according to claim 2, wherein the axis of the swivel shaft forms an angle of within 30° with a horizontal plane, and the nose of the cutting tool is positioned on the axis.

4. The vertical lathe according to claim 2, wherein the bearing is an air bearing.

5. The vertical lathe according to claim 2, wherein the swivel index means includes a servo motor for driving the swivel shaft, and an encoder for detecting the swivel angle of the swivel shaft.

6. The vertical lathe according to claim 1, wherein a planer table adapted for planing, having a linear axis, is mounted on the rotary table.

* * * * *